July 24, 1934.  H. T. SEELEY  1,967,907
CONTROL SYSTEM
Filed Oct. 2, 1931
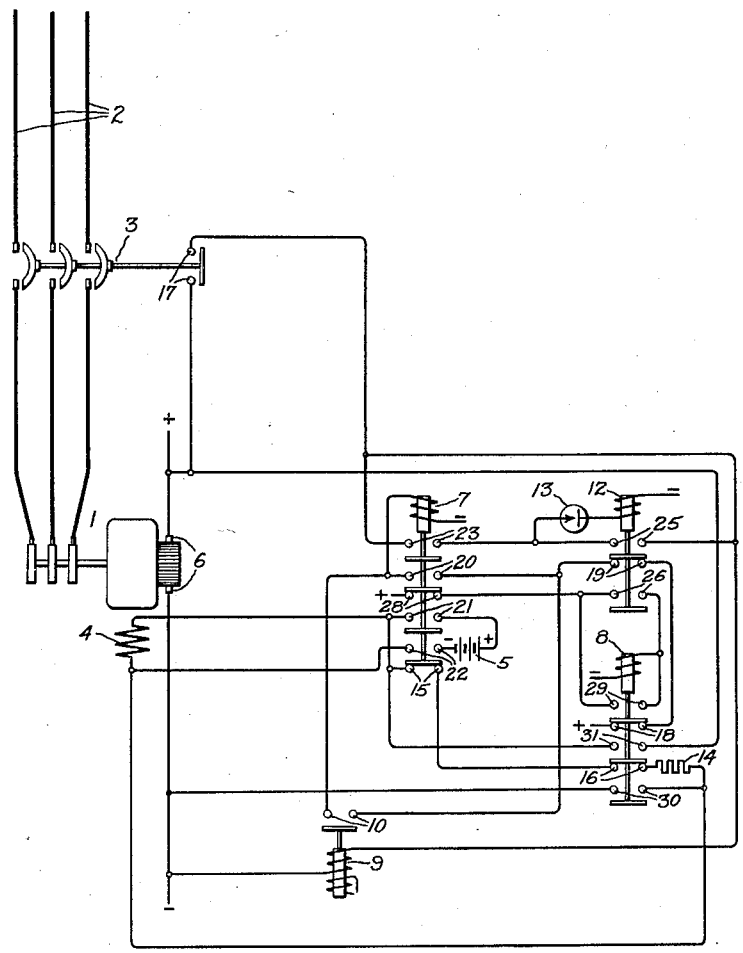
Inventor:
Harold T. Seeley,
by Charles E. Tullar
His Attorney.

Patented July 24, 1934

1,967,907

UNITED STATES PATENT OFFICE 1,967,907

CONTROL SYSTEM

Harold T. Seeley, Lansdowne, Pa., assignor to General Electric Company, a corporation of New York Application October 2, 1931, Serial No. 566,521

1 Claim. (Cl. 171—123)

My invention relates to control systems and particularly to systems for controlling the excitation of a synchronous converter during the starting thereof so that it develops a direct current voltage having a predetermined polarity and the object of my invention is to provide an improved arrangement for accomplishing this result.

My invention will be better understood from the following description, when taken in connection with the accompanying drawing the single figure of which diagrammatically illustrates a synchronous converter polarity control system embodying my invention and its scope will be pointed out in the appended claim.

Referring to the accompanying drawing, 1 represents a synchronous converter, the alternating current side of which is arranged to be connected to a suitable alternating current supply circuit 2 by means of a switch 3 which may be of any suitable type, examples of which are well known in the art.

The converter 1 is provided with a field winding 4 which is arranged to be connected by suitable switching means to a source of direct current 5 such as a battery which has a definite polarity and also across the direct current brushes 6 of the converter. As shown in the drawing, a contactor 7 is provided for connecting the field winding 4 to the battery 5 and a contactor 8 is provided for connecting the field winding 4 across the direct current brushes 6.

Any suitable speed responsive means, examples of which are well known in the art, may be provided to effect the operation of the contactor 7 after the converter speed has reached a predetermined value during the starting operation thereof. As shown in the drawing, this result is accomplished by means of a relay 9 which is connected across the direct current brushes 6 of the converter in response to the closing of the switch 3 and which is designed in a manner well known in the art so that it operates only in response to direct current. Since direct current is obtained from the brushes 6 only when the converter is running at synchronous speed, the relay 9 operates to close its contacts 10 and complete an energizing circuit for the contactor 7 only after the converter has accelerated to synchronous speed.

In order to change the excitation of the converter from separate excitation to self-excitation after the polarity of the converter is correct, I provide in accordance with my invention, a relay 12 and a suitable rectifying device 13 which are arranged to be connected in series across the direct current brushes 6 when the contactor 7 is closed. When the converter 1 has the correct polarity, the rectifying device 13 allows current to flow through the relay 12 which, in turn, effects the opening of contactor 7 to disconnect the field winding 4 from the source 5 and the subsequent closing of the contactor 8 to connect the field winding 4 across the brushes 6. The relay 12 also is arranged to complete for its operating coil a locking circuit which is independent of the switch 7 so that the subsequent opening of this switch does not effect the deenergization of the relay.

In order to prevent the insulation of the field winding 4 from breaking down during the starting operation, the winding 4 is arranged to be short-circuited through a discharge resistor 14 when both of the contactors 7 and 8 are open. In series in this circuit are the contacts 15 of the contactor 7 and the contacts 16 of the contactor 8.

The operation of the arrangement shown in the drawing is as follows: When it is desired to start the synchronous converter 1, the switch 3 is closed to connect the converter to the supply circuit 2. The converter 1 then starts and accelerates to synchronous speed. When the switch 3 is closed, its auxiliary contacts 17 connect the operating winding of the speed responsive relay 9 across the direct current brushes 6 of the converter 1 but the alternating current that flows through this winding while the converter is operating below synchronous speed does not effect the operation of the relay. When, however, the converter reaches synchronous speed and direct current flows through the operating winding of the relay 9, the relay closes its contacts 10 and completes an energizing circuit for the operating coil of the contactor 7. This circuit is from the one side of a suitable control circuit through contacts 18 of contactor 8, contacts 19 of relay 12, contacts 10 of relay 9, operating coil of contactor 7 to the other side of the control circuit. The contactor 7 by closing its contacts 20 completes for its operating winding a locking circuit which is independent of the contacts 10 of relay 9. By opening its contacts 15 and closing its contacts 21 and 22 the contactor 7 disconnects the field winding 4 from the discharge resistor 14 and connects the field winding to the separate source of excitation 5 so that the field winding is excited to produce the correct polarity across the brushes 6. By closing its contacts 23 the contactor 7 also connects the contacts 17 of the switch 3, the rectifying device 13 and the operating coil of the relay 12 in series across the brushes 6.

When the polarity of the converter 1 is correct after the contactor 7 closes, the relay 12 operates to open its contacts 19 and closes its contacts 25 and 26. By closing its contacts 25, the relay 12 completes for its operating coil a locking circuit which is independent of the contacts 23 of the contactor 7 so that the subsequent opening of this contactor does not effect the deenergization of the relay 12. By opening its contacts 19, the relay 12 opens the circuit for the operating coil of contactor 7 so that the field winding 4 is disconnected from the separate source of excitation 5. The contactor 7 by closing its auxiliary contacts 28, completes through contacts 26 of relay 12 an energizing circuit for the operating coil of contactor 8. By closing its contacts 29 the contactor 8 completes for its operating winding a locking circuit which is independent of the contacts 26 of relay 12. By closing its contacts 30 and 31 the contactor 8 connects the field winding 4 across the brushes 6 of the converter so that it is now self-excited and the direct current voltage has the correct polarity.

While I have, in accordance with the patent statutes, shown and described my invention as embodying various devices diagrammatically indicated, changes and modifications will be obvious to those skilled in the art and I, therefore, aim in the appended claim to cover all such changes and modifications as fall within the true spirit and scope of my invention.

What I claim as new and desire to secure by Letters Patent of the United States, is:—

In combination, a synchronous converter, a source of excitation having a fixed polarity, switching means for connecting said source to the field winding of said converter, other switching means for connecting the field winding of said converter across the direct current brushes of said converter, a relay, a rectifying device, speed responsive means for effecting the closing of said first mentioned switching means when the speed of said converter exceeds a predetermind amount, means controlled by said first mentioned switching means for connecting said relay and said rectifying device in series across the direct current brushes of said converter, and means controlled by said relay for effecting operation of said first mentioned switching means to disconnect said converter field winding from said source and the subsequent operation of said other switching means to connect the converter field winding across the direct current brushes of said converter, and means controlled by said relay for completing, independently of said first mentioned switching means, a series locking circuit for said relay and rectifying device.

HAROLD T. SEELEY.